US007239989B2

(12) United States Patent
Kothuri

(10) Patent No.: US 7,239,989 B2
(45) Date of Patent: Jul. 3, 2007

(54) WITHIN-DISTANCE QUERY PRUNING IN AN R-TREE INDEX

(75) Inventor: Ravi Kanth V. Kothuri, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 10/621,455

(22) Filed: Jul. 18, 2003

(65) Prior Publication Data

US 2005/0015216 A1    Jan. 20, 2005

(51) Int. Cl.
*G06F 17/10* (2006.01)
*G06F 7/00* (2006.01)

(52) U.S. Cl. .................. 703/2; 707/2; 707/3; 707/5; 703/13; 703/21

(58) Field of Classification Search ............... 703/21, 703/27, 2; 707/2, 3, 5; 382/261
See application file for complete search history.

(56) References Cited

U.S. PATENT DOCUMENTS

| | | | |
|---|---|---|---|
| 5,428,744 A | | 6/1995 | Webb et al. |
| 5,710,916 A | | 1/1998 | Barbara et al. |
| 5,988,853 A | | 11/1999 | Kim et al. |
| 6,252,605 B1 | * | 6/2001 | Beesley et al. ............. 345/441 |
| 6,263,334 B1 | * | 7/2001 | Fayyad et al. ................ 707/5 |
| 6,308,177 B1 | | 10/2001 | Israni et al. |
| 6,438,269 B1 | * | 8/2002 | Kim et al. ................... 382/261 |
| 6,778,981 B2 | * | 8/2004 | Lee et al. ....................... 707/3 |
| 6,847,384 B1 | * | 1/2005 | Sabadell et al. ............ 345/672 |
| 6,868,410 B2 | * | 3/2005 | Fortin et al. ................... 706/45 |
| 6,915,289 B1 | * | 7/2005 | Malloy et al. ................. 707/2 |
| 7,080,065 B1 | * | 7/2006 | Kothuri et al. ................ 707/3 |
| 2002/0087570 A1 | * | 7/2002 | Jacquez et al. ............. 707/100 |
| 2004/0249809 A1 | * | 12/2004 | Ramani et al. ................ 707/4 |

OTHER PUBLICATIONS

"Quadtree and R-tree Indexes in oracle Spatial: A Comparison using GIS Data", Kothuri et al, ACM SIGMOD '2002, Jun. 4-6, 2002.*
Spatial Databases—Accomplishments and Research Notes, Shekhar et al, IEEE Transactions on Knowledge and Data Engineering, vol. 11, No. 1, 1999.*
P. Fischer et al., Computing a Maximum Axis-Aligned Rectangle in a Convex Polygon, Information Processing Letters 51 (1994) 189-193.
R. Kothuri et al, Efficient Processing of Large Spatial Queries Using Interior Approximations, Advances in Spacial and Temporal Databases, Lecture Notes in Computer Science, 2121, pp. 404-424, Redondo Beach, CA, Jul. 2001.
H. Alt et al., Computing the Largest Inscribed Isothetic Rectangle, pp. 1-8, Proc. 7th Canadian Conference Computational Geometry, Universit'e Laval, Qu'ebec, Aug. 1995.
K. Kanth et al., Indexing Medium-Dimensionality Data in Oracle, Proc. Of ACM SIGMOND Intl. Conference on Management of Data, pp. 521-533, Jun. 1999.
Silva et al. "An Exact Interactive Time Visibility Ordering Algorithm for Polyhedral Cell Complexes", IEEE 1998, pp. 87-94.

* cited by examiner

*Primary Examiner*—Fred Ferris
(74) *Attorney, Agent, or Firm*—Bingham McCutchen LLP

(57) ABSTRACT

A method for determining a with-distance relationship between a first geometry object and a second geometry object. The method includes defining an exterior approximation of the first geometry and the second geometry. A distance between the exterior approximations is computed. The computed distance is compared with a first predetermined distance to determine whether the second geometry satisfies a first filter condition with respect to the first geometry.

18 Claims, 7 Drawing Sheets

WITHIN-DISTANCE QUERY PRUNING IN AN R-TREE INDEX

FIELD OF THE INVENTION

The present invention relates to a method for determining relationships among one or more query geometries and one or more data geometries.

BACKGROUND OF THE INVENTION

Information in databases may be organized according to any number of techniques. Examples of the many database indexes include the quadtree, the B-tree, and the R-tree. Different database index structures may be more suitable for particular types of data. For example, some database index structures, such as B+trees, may not be suited for multidimensional data.

The R-tree is an object hierarchy that is applicable to arbitrary spatial objects that is formed by aggregating minimum bounding boxes for the spatial objects and storing the aggregates in a tree structure. The aggregation is based, in part, on proximity of the objects or bounding boxes. Each node in the tree represents a region in the space. Its children represent (possibly overlapping) subregions. The child regions do not need to cover the entire parent region. While the R-tree is designed primarily for storing region objects, it can be adapted to points by defining points as "degenerate" rectangles where all vertices are identical.

The number of objects or bounding boxes that are aggregated in each node is permitted to range between $m \leq (M/2)$ and M, thereby leading to use of the prefix (m,M) to characterize a particular R-tree and mirroring the effect of a B-tree. The root node in an R-tree has at least two entries unless it is a leaf node, in which case it has just one entry corresponding to the bounding box of an object. The tree is height-balanced (with maximum height $\log_m r$).

An R-tree can be constructed in either a dynamic or a static manner. Dynamic methods build the R-tree as the objects are encountered, while static methods wait until all the objects have been input before building the tree. The results of the static methods are usually characterized as being packed since knowing all of the data in advance permits each R-tree node to be filled to its capacity.

There are two principal methods of determining how to fill each R-tree node. The most natural method is to take the space occupied by the objects into account when deciding which ones to aggregate. An alternative is to order the objects prior to performing the aggregation. However, in this case, once an order has been established, there is not really a choice as to which objects (or bounding boxes) are being aggregated. One order preserves the order in which the objects were initially encountered. That is, the objects in aggregate i have been encountered before those in aggregate i+1.

According to one method, insertion of a region object R occurs as follows. Starting at root, children that completely contain R are identified. If no child completely contains R, one of the children is chosen and expanded so that it does contain R. If several children contain R, one is chosen and the process proceeds to the next child.

The above containment search is repeated with children of the current node. Once a leaf node is reached, R is inserted if there is room. If no room exists in the leaf, it is replaced by two leaves. Existing objects are partitioned between two leaves and parent. If no room exists in the parent, change propagates upward.

One difference between static and dynamic methods is that static methods rebuild the entire R-tree as each new object is added. In contrast, dynamic methods add the new objects to the existing R-tree. Dynamic methods differ in the techniques used to split an overflowing node during insertion.

There are two types of dynamic methods. The first type has the goal of minimizing coverage and overlap. These goals are at times contradictory and thus heuristics are often used. The second type makes use of the ordering applied to the objects (actually their bounding boxes). They are termed nonpacked. In this case, the result is equivalent to a B+-tree and all update algorithms are B+-tree algorithms. These update algorithms do not make use of the spatial extent of the bounding boxes to determine how to split a node. Thus, the goals of minimizing overlap or coverage are not part of the node splitting process although this does not preclude these methods from having good behavior with respect to these goals.

Static methods differ on the basis of the method used to order the objects. The dynamic methods that are not based on an ordering, that is, reduction of coverage and overlap, range from being quite simple, for example, exhaustive search, to being fairly complicated, for example, R*-tree. Some method just split the overflowing node, while others, that is, the R*-tree, try to reinsert some of the objects and nodes from the overflowing nodes thereby striving for better overall behavior (e.g., reduction in coverage and overlap).

In general, the goal of splitting techniques is to minimize coverage and overlap. These goals are at times contradictory and, thus, heuristics are often used. Below are listed a few node splitting algorithms that range from being quite simple, for example, exhaustive search, to being fairly complicated, for example, R*-tree. Some methods split the overflowing node, while others try to reinsert some of the objects and nodes from the overflowing nodes, thereby striving for better overall behavior, for example, reduction in coverage and overlap.

A number of different node splitting algorithms may be tried, including:
  I. Dynamic methods based on minimizing coverage and/or overlap
    1. Exhaustive search
    2. Quadratic method
    3. Linear method
    4. R*-tree
    5. Ang/Tan method
  II. Dynamic methods based on an ordering (nonpacked)
    1. Hilbert nonpacked
    2. Morton nonpacked
  III. Static methods based on an ordering
    1. Packed
    2. Hilbert packed
    3. Morton packed
    4. VAM split R-tree
    5. Top-down-greedy split (TGS) R-tree Methods I and II are useful for insertion, while method III is typically used for "bulk" creation, that is, creation of indices on a given set of objects.

SUMMARY OF THE INVENTION

The present invention provides a method for determining a with-distance relationship between a first geometry object and a second geometry object. The method includes defining an exterior approximation of the first geometry and the second geometry. A distance between the exterior approximations is computed. The computed distance is compared with a first predetermined distance to determine whether the second geometry satisfies a first filter condition with respect to the first geometry.

Also, the present invention a computer program product for performing a process of determining relationships among objects represented in a database. The computer program product includes a computer readable medium and computer program instructions, recorded on the computer readable medium, executable by a processor. The computer program instructions are for performing the steps of defining an exterior approximation of the first geometry and the second geometry, computing a distance between the exterior approximations, and comparing the computed distance with a first predetermined distance to determine whether the second geometry satisfies a first filter condition with respect to the first geometry.

Furthermore, the present invention provides a system for performing a process of determining relationships among objects represented in a database. The system includes a processor operable to execute computer program instructions and a memory operable to store computer program instructions executable by the processor. The computer program instructions are for performing the steps of defining an exterior approximation of the first geometry and the second geometry, computing a distance between the exterior approximations, and comparing the computed distance with a first predetermined distance to determine whether the second geometry satisfies a first filter condition with respect to the first geometry.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

A spatial or geographic database can include data concerning locations of features in space or on a surface. Spatial data can include geometric data that includes simple primitive elements such as lines, curves, polygons (with and without holes), and compound elements that are made up of a combination of the primitive elements. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular location. Along these lines, a person might want to find certain types of businesses in a zip code region. At times, it may be desirable to generally determine whether objects in a database have overlapping locations and, if so, the extent of the overlap.

Analyses such as those described above of data in spatial and/or geographic databases can present a number of problems. To determine relationships among data in a database can overtax memory and computing power, take an unacceptable period of time or cost an unacceptable amount of money. This is especially true with data in geographic databases.

For example, one problem concerning trying to determine whether objects have overlapping locations can involve actually comparing the outlines of the objects to see if any interactions exist. However, carrying out a point-by-point comparison of two geometries typically requires quite a long time, in some cases, on the order of minutes and, in extreme cases, hours.

The present invention provides a solution to problems of analyzing objects in databases. As such, the present invention provides a fast and simple method for determining whether two objects, or geometries, defined by data in a database intersect. Rather than taking minutes or hours to carry out, the present invention can take on the order of seconds or milliseconds. By reducing calculation times, the present invention can free up a processor to perform other calculations or for other uses, such as queries or scalability. The present invention also permits better service to be provided by reducing response times. This helps to ensure that the solution can be utilized with any geographic database, regardless of how large.

Figure 1:
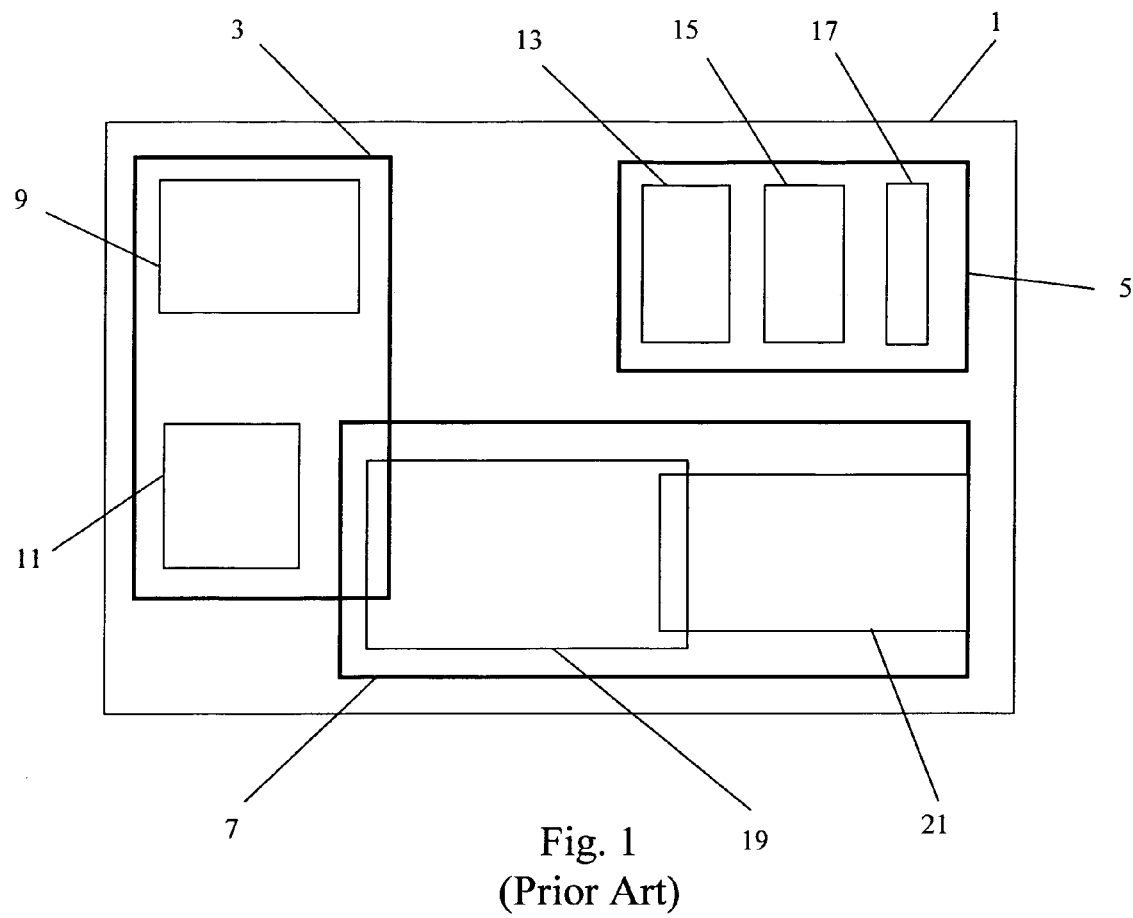
FIG. 1 represents an example of an R-tree node including two levels of children.

FIG. 1 represents a simple R-tree for illustrative purposes. The R-tree shown in FIG. 1 includes a plurality of rectangular objects. An R-tree may be utilized to index databases of objects in the form of points, lines, or rectangles. The objects may be represented by minimum bounding contours. Additionally, the objects may be grouped in groups by minimum bounding contours.

The R-tree node shown in FIG. 1 includes two levels of children. Node 1 shown in FIG. 1 includes minimum bounding contours 3, 5, and 7, representing the first level of children. Each child node 3, 5, and 7, in turn, includes a plurality of child nodes, 9 and 11 in child 3; 13, 15, and 17 in child 5; and 19, and 21 in child 7. Each child node is defined by a minimum-bounding contour. In the example shown in FIG. 1, the minimum bounding contours are all rectangles.

Figure 2:
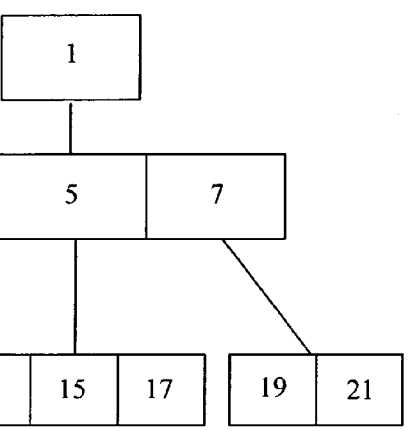
FIG. 2 represents a block diagram of an R-tree index corresponding to the example shown in FIG. 1.

FIG. 2 represents a block diagram showing an R-tree corresponding to the example illustrated in FIG. 1. For objects that are stored in respectively different leaf nodes, the more remote the nearest common ancestor node, the more different the objects are likely to be. That is, strokes or strings stored in leaf nodes having a common parent are likely to be more similar to each other than strokes or strings stored in leaf nodes only having a common grandparent.

The R-tree index may be utilized to support medium-dimensionality data, that is, data having a dimensionality in the range of 3-10. The R-tree index may be implemented utilizing an extensible indexing framework. One example of such a framework is referred to as cooperative indexing in Oracle8i, available from Oracle Corporation. This framework can allow easy creation and maintenance of domain-specific index structures on top of a server layer while reaping the full benefits of operating within a database framework. As a consequence, the R-tree index structure inherits features such as transactional semantics, integrated backup and recovery, security, and replication from the underlying database.

In the specific example of Oracle8i, the R-tree index can index two datatypes. The first datatype includes an sdo_mbr type, which is a d-dimensional rectangle specified by the lower-left and the upper-right corners. The second datatype, is an sdo_geometry type, which is an Oracle8i object type that allows for the specification of complex geometries (as defined by OGC).

Data items may be stored in a relational table, which may be referred to as the base table. The R-tree constructed for the data items may be stored in the database using a metadata table storing the information about the root of the R-tree, its dimensionality and fanout, and the name of the index table storing the nodes of the R-tree.

The R-tree index type can support three types of operations: window queries, nearest-neighbor queries, and intersection joins. Window queries specify a query window and retrieve data whose MBRs interact with the query window in one of 4 ways: intersection, containment, enclosure and exact-match. Nearest-neighbor queries specify a query point and retrieve the k closest data MBRs. Joins identify the data items of two different datasets that intersect with each other. Note that these queries are processed using the MBRs. For some applications such as GIS data where the bounding rectangles only represent first-level approximations of the data items, the query result may have to be post-processed using the complete extents of the data items to obtain the final result. In addition to indexing inherently multi-dimensional columns, R-trees can also be used to index multiple columns so as to answer queries on multiple columns efficiently.

A number of relationships can exist between and among objects represented in the R-tree. The objects may overlap to some extent, an object may lie entirely in another object or vice versa, the borders of objects may intersect, or the objects may be disjoint and have no overlap at all. Typically, a "query" geometry is provided and it is desired to identify geometries in the database, or "data geometries", that do or do not interact in some manner with the query geometry. Some times, it may be desirable to determine objects interacting in specific ways, such as all objects entirely within a query geometry. At other times, it may be desirable to identify any objects that "interact" with a particular query geometry. While objects may be compared by performing an exact comparison of the geometries that define the objects, such a comparison can take a long time and be very costly. For example, if a processor is tied up performing a comparison of geometries, then the processor is unavailable for other functions.

Examples of queries and interactions can include the following:
window queries with different "interaction" criteria
    intersection: identify data geometries that intersect the query geometry
    inside: identify data geometries that are "completely inside" the query geometry
    coveredby: identify data geometries that "touch" on at least one border and are inside the query geometry otherwise
    contains: reverse of inside
    covers: reverse of coveredby
    touch: identify geometries that only "touch" the query geometry but disjoint otherwise
    equal: identify geometries that are exactly the same as the query geometry within-distance (or epsilon) queries: identify geometries that are within a specified distance from the query geometry
nearest-neighbor queries: identify the k nearest neighbors for a query geometry.

Typically, the most frequently used window queries are the ones asking for intersection-type, inside-type, and contains-type of interactions. Within-distance queries can be thought of as intersection-type of window queries where the query geometry is enlarged by the specified distance.

Figure 3:
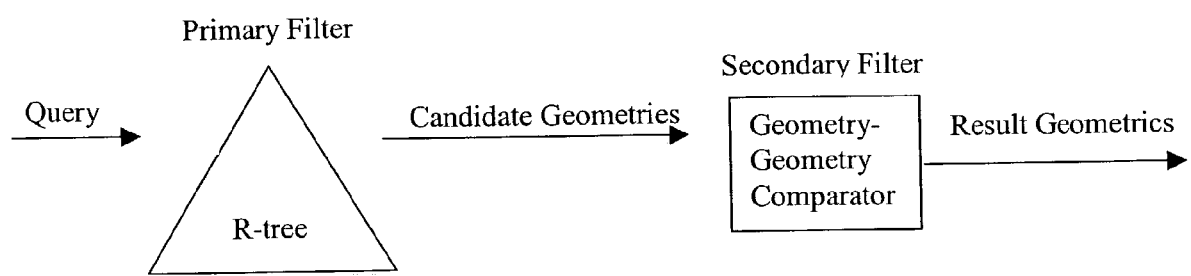
FIG. 3 represents a flowchart that illustrates query processing according to a known method.

Existing solutions to queries such as those described above may utilize a primary filter in a first stage to identify all candidate geometries that could possibly interact with a query geometry, as represented in FIG. 3. In the first stage exterior approximations for data geometries, such as minimum bounding rectangles (MBRs) and convex hulls, or quadtree tiles, which completely enclose the data geometries, may be used. This first stage, usually referred to as the primary filter, typically involves a spatial index. Candidate geometries that may satisfy a given query criterion are identified in the primary filter stage with the help of the exterior approximations in the spatial index.

In a second stage, referred to as a secondary filter, the candidate geometries identified in the first stage are compared with the query geometry and the exact result set is determined and returned to the user. A secondary filter is then employed to perform the exact mathematical comparison of all of the candidate geometries with the query geometry. Even utilizing such filters, the mathematical comparison can be quite expensive. For example, if the query geometry is large, there will be too many candidates that are completely inside the query geometry. As described above, passing each candidate through the secondary filter is quite expensive. On the other hand, if the query is small and many candidates exist that contain the query, then the query can also be quite expensive.

For most spatial datasets, the data geometries typically have hundreds or thousands of vertices and are arbitrarily complex. Secondary filter computation for such geometries takes a long time as opposed to the primary filter. FIG. 2(a) illustrates this by comparing the time taken for primary and secondary filters according to an example utilizing Oracle Spatial available from Oracle Corporation. The data consists of 230K polygons representing the US census blocks. The queries correspond to an approximate geometry that represents a circle of 0.25, 0.5, 1, 2, 5, 10, 25, 50, or 100 mile radius on the surface of earth. Since arcs and circles are not easily representable on the surface of the earth the circle queries are densified to regular convex polygons in geodetic and non-geodetic domains. The center of the query is randomly-generated using locations of business centers across the United States. Such queries, where the query area is larger than those of the spatial features, are quite common in most GIS applications and spatial analysis queries. The x-axis shows the radius in miles from the query center and the y-axis plots the response time for each filter. The figure illustrates that the secondary-filter time is at least twice that of the filter time and dominates the overall computation time. This holds for all radii for the query circle.

The high cost for carrying out the secondary-filter is due to two reasons. First, the loading cost for geometries, or in other words, the cost of the table accesses that fetch candidate geometries. Second, the high cost is attributable to the comparison cost, which is the cost of comparing complex data geometries with the query geometry. For point datasets, the loading cost dominates and for polygon datasets, both costs contribute significantly.

The present invention provides a method that can analyze the geometries and eliminate many geometries from the need to perform the costly and time-consuming mathematical comparison of the geometries. The present invention solves the problem by including an intermediate filter that can eliminate many, if not most, candidates from needing to undergo the expensive secondary filter. The present invention is particularly useful where the query geometry is particularly large or particularly small. Identifying geometries that lie entirely within the interior rectangle can eliminate these geometries from undergoing the costly exact mathematical comparison.

Figure 4A:
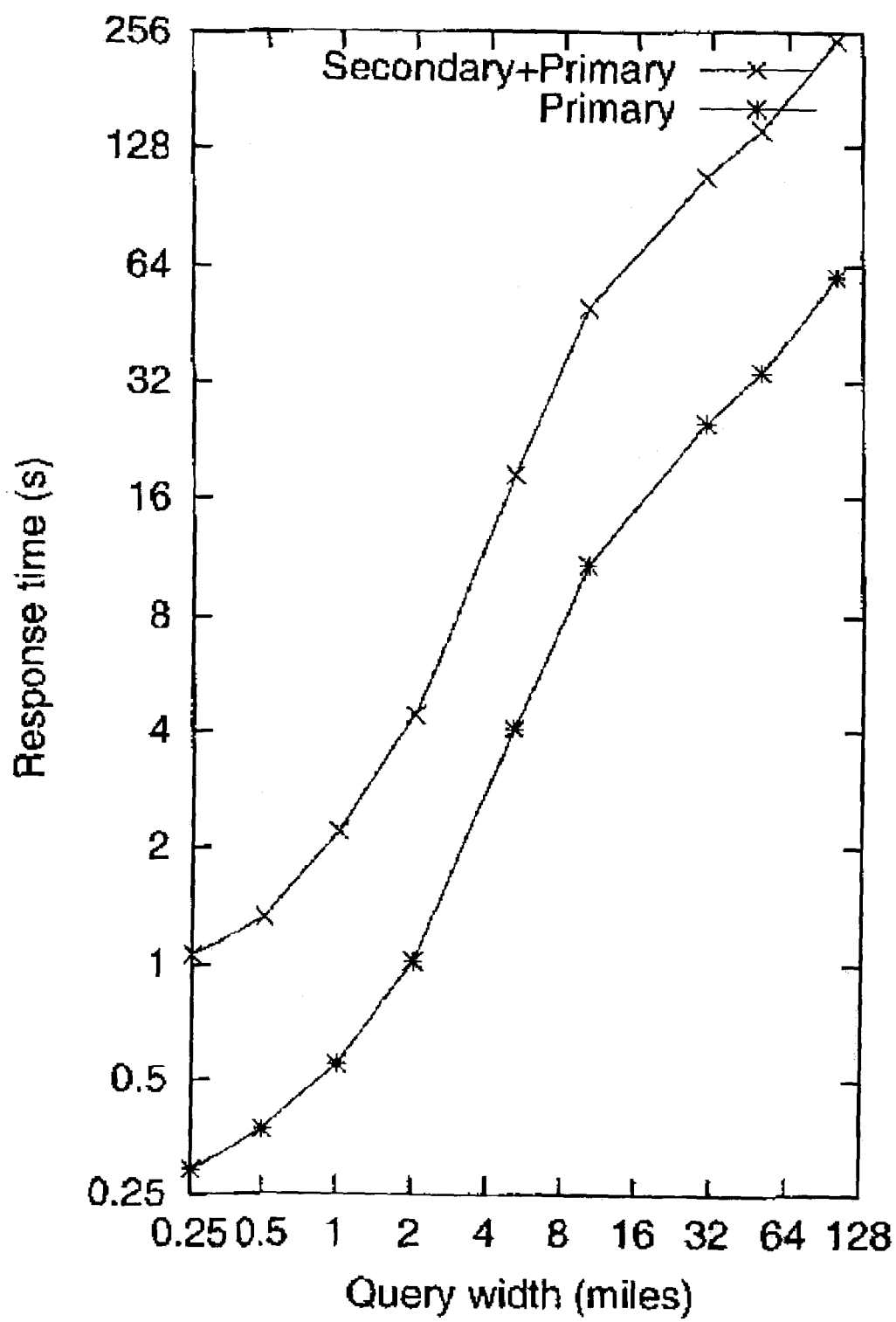
FIG. 4*a* represents a graph that illustrates a relationship between response time and query width for a query carried out according to a known process including a primary and a secondary filter.
Figure 4B:
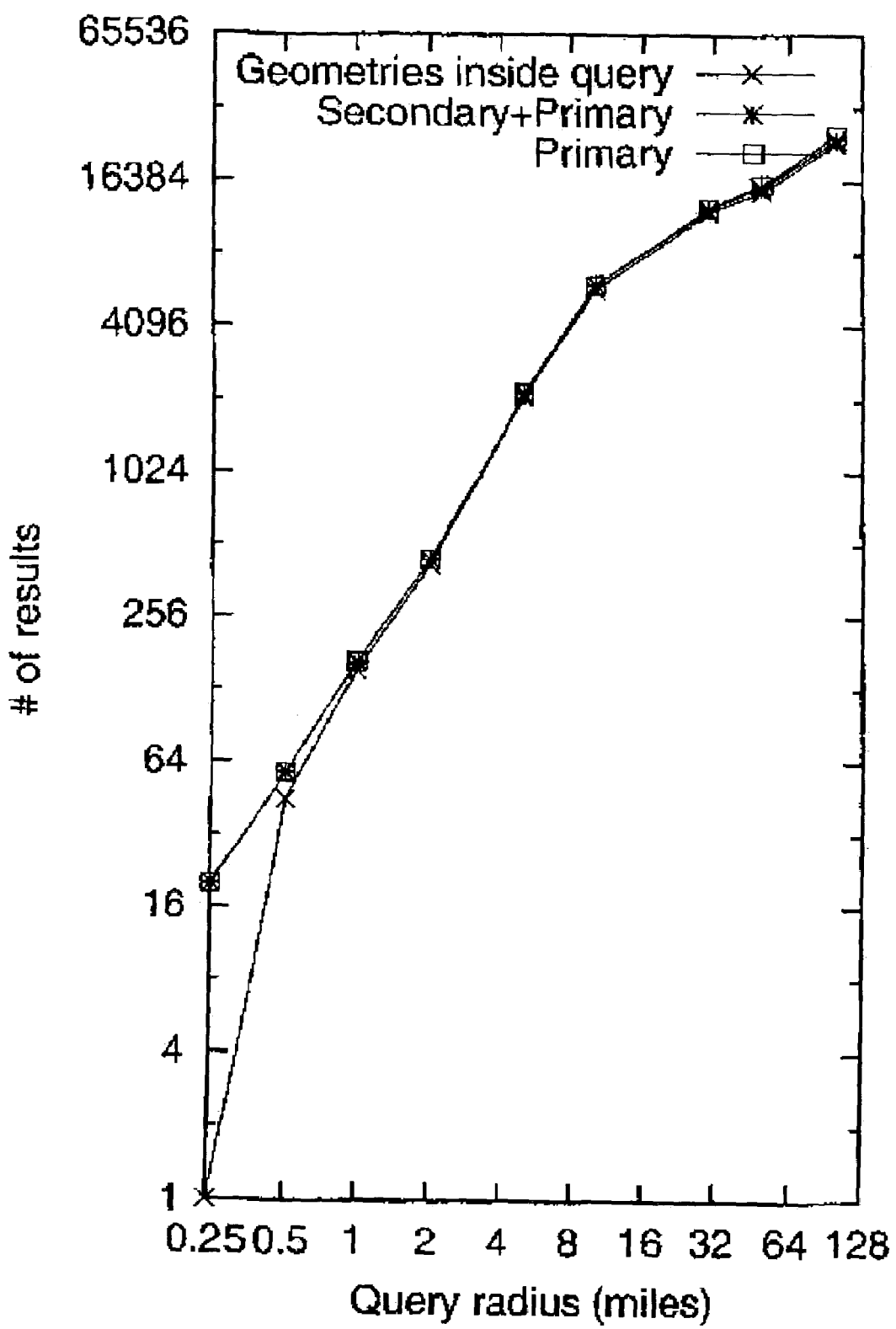
FIG. 4*b* represents a graph that illustrates a relationship between number of results and query radius for a query carried out according to a known process including a primary and a secondary filter.

FIG. 4(a) illustrates that the number of geometries eliminated in the secondary filter is quite small compared to the total number retrieved. FIG. 4(b) shows that in almost all the cases the difference in primary and secondary filter results is less than about 10%. Additionally, FIG. 4(b) also indicates that as the query radius increases a substantial number of the results are completely inside the query. From this, it could be inferred that whenever the query window is large compared to data sizes, checking for containment in the query may be a useful pruning strategy for bypassing the secondary filter. That is, if a data geometry is completely inside a query geometry, then it could be accepted without passing it to the expensive secondary filter.

In order to improve query performance, the idea is to eliminate expensive query-data geometry comparisons whenever possible. This is possible for data geometries that are completely interior to query geometries which can be directly included in the result set without doing the expensive query and data geometry comparison. To determine whether a data geometry is interior to a query geometry the present invention includes two solutions.

The present invention is particularly related to the situations where the query is to retrieve the k-closest data geometries to a specified query geometry using the R-tree index. Since, as described above, data-query geometry distance computations are expensive, these should be minimized. The present invention provides a new and particularly effective way to reduce the cost and time required to solve such queries.

Known solutions/implementations for solving nearest neighbor queries may first utilize minimum bounding rectangle (MBR) approximations in the index to compute the minimum distance of the query and a data item. If this distance d is greater than the maximum distance to the "current candidate" set of k neighbors then the data geometry is pruned/filtered out from further searching. Otherwise, the "expensive" exact distance between the data and query geometries is computed. Since many such candidate sets of neighbors are evaluated, there are many "exact" distance computations that could slow down query performance.

The present invention provides a unique solution to retrieve data geometries within a specified distance of a query geometry using the R-tree index. The solution of the present invention avoids fetching a data geometry and computing the exact distance between data and query geometries whenever possible. Typically, the present invention includes two parts. Each part may be carried out in different ways. The parts address identifying candidate geometries that satisfy one or more filter conditions before carrying out any exact mathematical comparisons of the geometries.

The present invention may utilize approximations of the interior and/or the exterior of query and/or data geometries. These approximations may then be compared one or more times in some manner to data and/or query geometries and/or to each other to reduce the number of geometries on which the exact comparison must be made. In particular, the comparisons may include whether a geometry and/or an approximation of a geometry is within a user specified distance of another geometry and/or approximation of a geometry. The comparisons make it relatively easy to either include or exclude geometries from a solution set. The remaining geometries are the ones that it may be necessary to perform the mathematical comparisons on.

According to one embodiment, exterior approximations of a first geometry and a second geometry are defined. Typically, the term "first geometry" is used herein to describe a query geometry and term "second geometry" is used to describe a data geometry. Any exterior may be employed. Typically, the exterior approximations includes a minimum bounding rectangle, but could also include circles or other approximations. After computing the exterior approximations, a distance between the exterior approximations may be computed. Then, the distance between the exterior approximations is compared to a user-specified distance to determine whether the second geometry satisfies a first filter condition with respect to the first geometry. The present invention is particularly useful in "within-distance" queries. Along these lines, the process of the invention may be utilized to determine which data geometries lie within a certain distance of a query geometry. Therefore, the first filter condition could include whether the exterior approximations are within a certain distance of each other. If the maximum distance between the exterior approximations of first and second geometries is less than a user-specified distance, then the second geometry is added to the result set bypassing expensive actual-distance comparison (secondary filter).

After carrying out the comparison with the exterior approximations, an interior approximation of the first geometry may be defined. The interior approximation may be expanded by a user defined or predetermined distance. Any other interior approximation, such s a largest inscribed rectangle, could also be utilized. According to one embodiment, the interior approximation may include one or more interior circles defined as described below in greater detail. The expansion of the interior approximation depends upon the user-specified distance. The distance typically is related to the size of the geometries and the specificity of the query.

After expanding the interior approximation, the expanded approximation may be compared to the second geometry to determine if the second geometry satisfies the first or another filter condition with respect to the first geometry. As with the comparison of the exterior approximations, the comparison of the expanded interior approximation and the second geometry may be carried out in a number of ways. Along these lines, the comparison may depend upon the query that is being conducted. If a within-distance query is being carried out, the first filter condition could include whether the interior approximation of the first (query) geometry, expanded by user-specified distance, contains the MBR of the second (data) geometry. That is, the MBR of the second geometry lies inside the expanded interior of the first geometry.

Rather than carrying out the defining of the exterior approximations first, the present invention may also include first defining the interior approximation and carrying out the comparison with the second geometry. In either case, the first filter condition may be satisfied if the second geometry is inside the expanded interior approximation. In this way, the expanded interior could act similarly to the user specified distance utilized in conjunction with the exterior approximations.

Geometries that either fulfill the first filter condition may be placed in a solution set of geometries. To determine whether geometries remaining after carrying out the process involving the interior and/or exterior approximations fulfill the query may require carrying out an exact mathematical comparison of the query and data geometries. As described above, the present invention can greatly decrease the amount of computing time spent on the exact comparison.

Where defining the exterior approximation includes defining a minimum bounding rectangle, a circle that circumscribes the rectangle may be computed. The circle may be compared with the second geometry to determine whether the second geometry satisfies the first filter condition with respect to the first geometry.

The first and second geometries may have any relative size. Along these lines, the first geometry may be larger than the second geometry or vice versa. Also, the first and second geometries typically may be two or three-dimensional. The geometries may represent various real objects. For example, the geometries may represent geographic locations.

Additionally, the first geometry may be a query geometry and the second geometry may be a data geometry stored in a database or vice versa. The database may be a spatial database. The database may store exact geometries and/or approximations of geometries. The database may be organized in an R-tree hierarchy or a variant of an R-tree.

One embodiment of the invention includes determining if a data geometry is interior to a query geometry of a within-distance query. Those data geometries can be directly included in the result set without having to perform exact distance computations between query and data geometries (secondary filter) saving in query response time. The within-distance query is specified using a query window and a user-specified distance. Determining whether a data geometry is interior to the within-distance query may be done in one of two ways: (1) by comparing the maximum distance between the MBRs of the data and query geometries with user-specified distance, or (2) by expanding the interior of query geometry by user-specified distance and checking if the data MBR is inside it. These are explained below further.

As described above, it is determined if a maximum distance between a minimum bounding rectangle (MBR) of the query and a minimum bounding rectangle of the data (MBR) satisfies one or more filter conditions. One example of a filter condition is whether the maximum distance between a minimum bounding rectangle of the query and a minimum bounding rectangle of the data is less than a user-specified threshold distance. If the maximum distance satisfies the filter condition, then the data geometry may be directly included in the query result. This means the data geometry is interior to the query geometry expanded by the user-specified distance. According to the second approach, the interior approximation of the first (query) geometry is expanded by the user-specified distance. If the MBR of the second (data) geometry fulfils a first-filter condition such as an inside relationship with respect to the expanded query interior, then it can be included directly in the result set. Interior approximations can be either circles, as described in co-pending U.S. patent application Ser. No. 10/397,530 to the same inventor as the present application, assigned to Oracle Corporation, for QUERY PRUNING USING INTERIOR CIRCLES FOR GEODETIC DATA IN AN R-TREE INDEX and filed Mar. 27, 2003, tiles or mbrs, as described in co-pending U.S. patent application Ser. No. 09/886,487, to Ravi Kanth V. Kothuri et al., assigned to Oracle Corporation, for QUERY PRUNING USING INTERIOR RECTANGLES IN AN R-TREE INDEX, and filed on Jun. 22, 2001, the entire contents of both of which are hereby incorporated by reference.

If the interior approximations are inscribed circles, one or more circles may be defined within a first geometry. The circles may or may not lie entirely within the first geometry. Also, the circles may be defined with centers at various locations in the first geometry. The circles are compared to a second geometry to determine if one or more filter conditions are satisfied. Determining if the conditions are satisfied can determine the relationship between the first and second geometries. Determining if one or more filter conditions are satisfied may be sufficient to discern the relationship between the first geometry and the second geometry.

Rather than comparing the circle(s) defined in the first geometry with the second geometry, the circle(s) may be compared with a minimum bounding rectangle or other representation of the second geometry. In such embodiments, a minimum bounding rectangle or other representation of the second geometry is defined. The circles, defined with respect to the first geometry or a minimum bounding rectangle or other representation of the first geometry, may then be compared to the minimum bounding rectangle or other representation of the second geometry.

In any of the above methods, rather than defining the circles with respect to the first geometry or a representation thereof, the circles may be defined with respect to the second geometry or a representation thereof The circles and the first geometry or representation thereof may then be compared. In either case, different filter conditions may be employed in the comparison of the geometries, representations of the geometries, circles and/or other elements.

Examples of interactions between geometries are described above. For illustration, examples expressed with respect to the present invention could include that the first or second geometry lies entirely within a circle defined with respect to the other of the first and second geometry. A second filter condition could include mathematically determining a relationship between a first geometry and a second geometry. Typically, such a comparison would not be carried out until geometries have been subjected to the method described above including defining circles and comparing the circles and the geometries.

According to another embodiment, a minimum bounding rectangle of the first geometry and/or second geometry may be identified. Then, a center of the geometry and a center of the minimum bounding rectangle for that geometry are determined. Next, a distance is determined between the center of the geometry and the center of the minimum bounding rectangle of the geometry. Then, a maximum distance is determined between the center of the minimum bounding rectangle and a corner of the minimum bounding rectangle. Subsequently, the radius of circle defined in the geometry, as described above, is compared to a sum of the maximum distance from the center of the minimum bounding rectangle to a corner of the minimum bounding rectangle to determine if the second geometry lies within the first geometry.

According to another embodiment, after defining one or more circles along a line, such as a maximum span dimension, of a first geometry, a minimum radius circumscribing circle for the second geometry is defined. Then, the minimum radius circumscribing circle for the second geometry is compared to the first geometry and/or one or more of the circles defined within the first geometry to determine if the first geometry fulfills a second filter condition with respect to the second geometry.

According to a further embodiment of the present invention, a circle having a minimum possible radius is defined about a first geometry. The minimum radius circle of the first geometry is compared to a second geometry to determine if the second geometry fulfills a first filter condition with respect to the first geometry. The minimum radius circle of the first geometry is compared to a second geometry to determine if the second geometry fulfills other filter conditions with respect to the first geometry. As with the comparisons described above, the filter condition(s) may include any of the filter conditions described above or any other filter condition that can help to determine whether a particular relationship between geometries exists or may have some likelihood of existing. Similarly, as also described above, carrying out a comparison may include making an exact mathematical comparison between the geometries.

The present invention may include any combination of the methods and/or portions thereof described above. Also, any of the methods and/or portions thereof may be carried out in any order. A main point of the present invention is to eliminate as many potential geometries as possible from needing to carry out an exact mathematical comparison.

Figure 5:
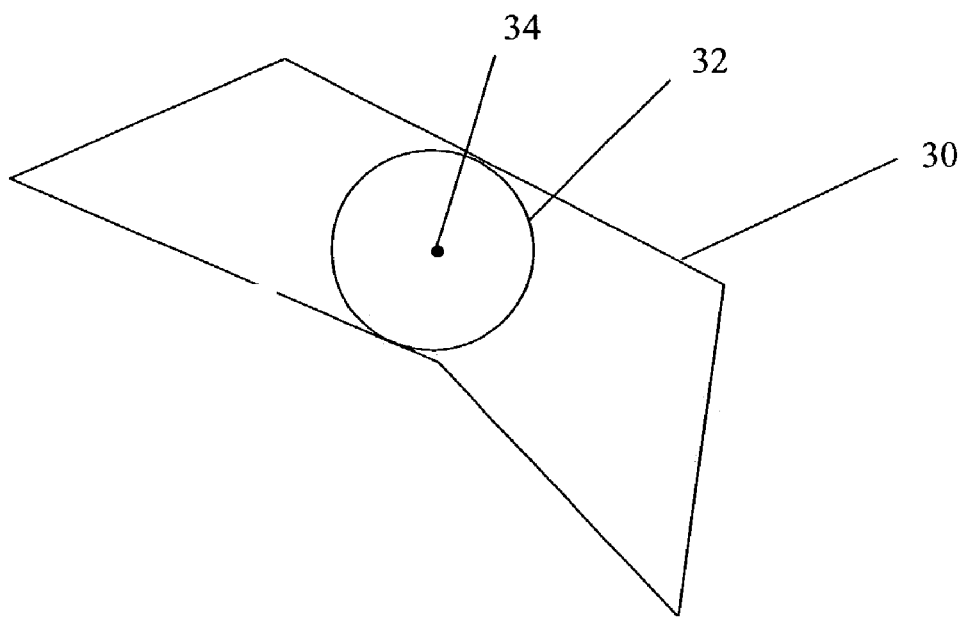
FIGS. 5-8 illustrate various aspects of elements of processes according to the present invention.
Figure 6:
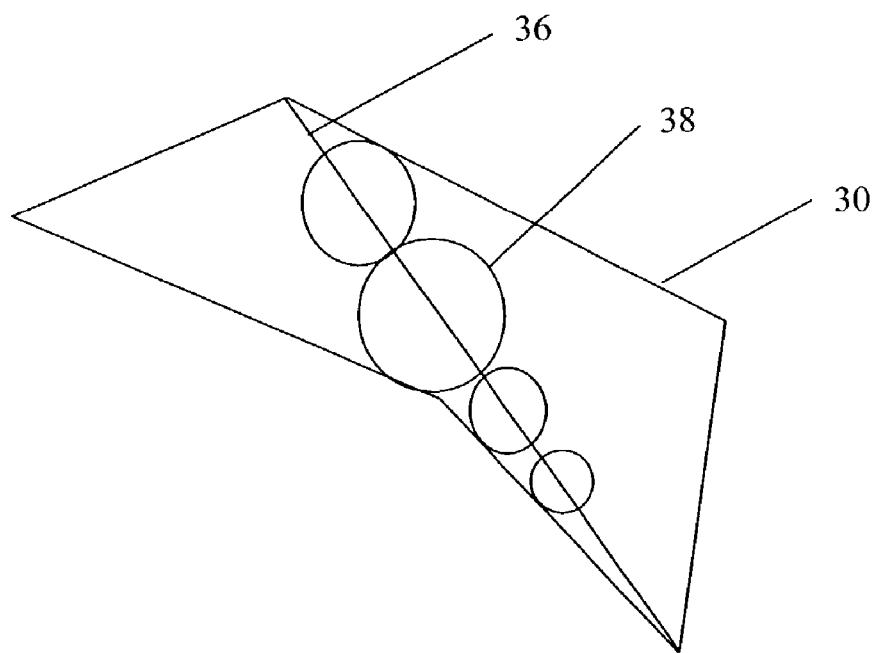
Figure 7:
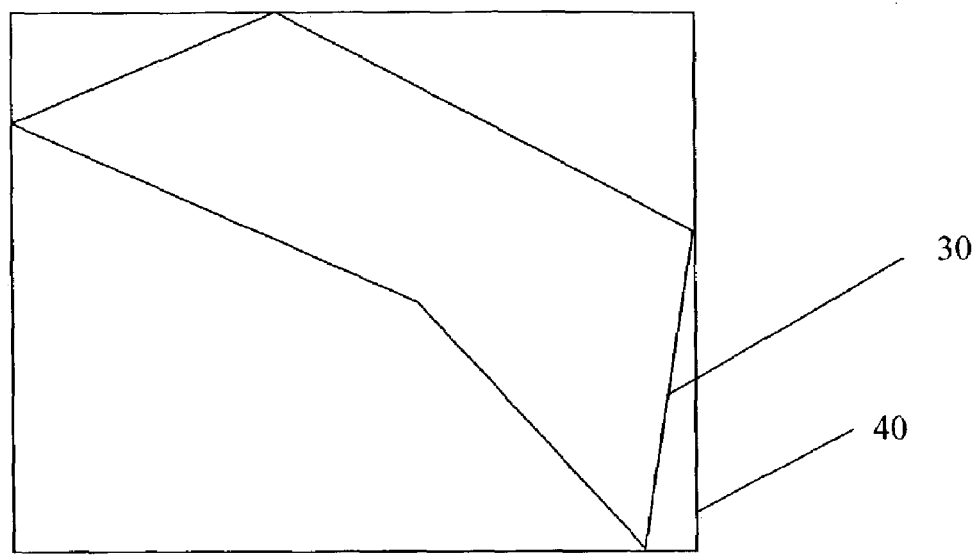
Figure 8:
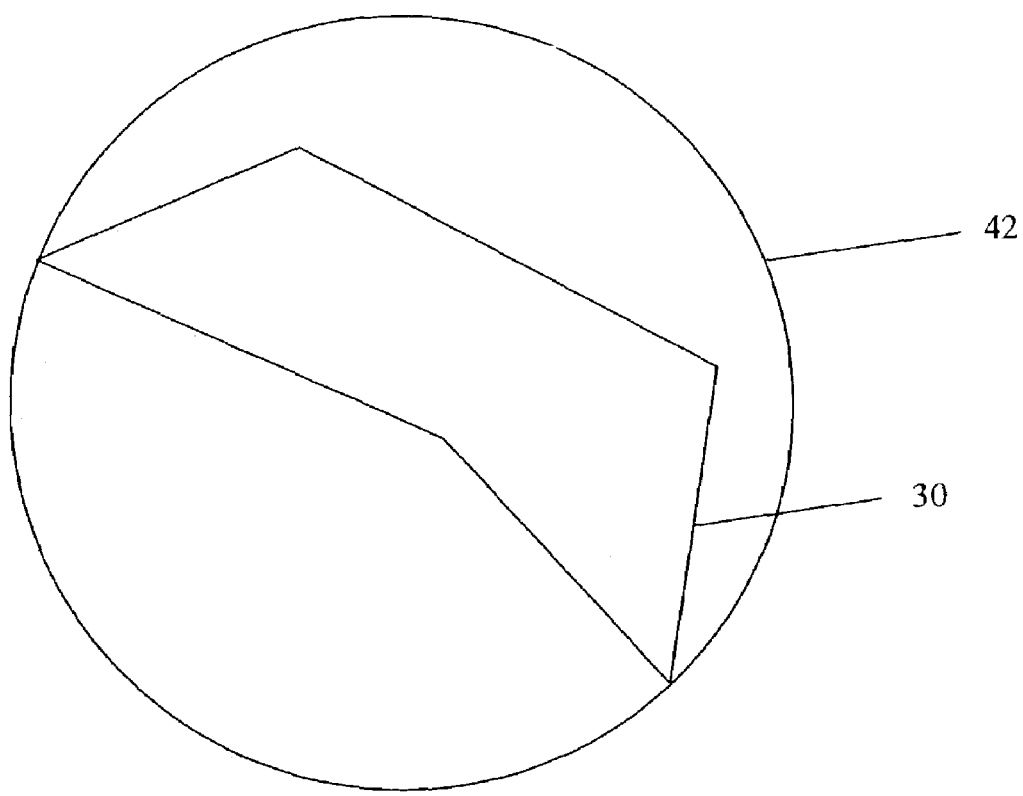

FIGS. 5-8 illustrate various aspects of the present invention. Along these lines, FIG. 5 illustrates a geometry 30 with a circle 32 defined about a center 34 of the geometry. The circle has as its radius the minimum distance from the center point to the boundary of the geometry. FIG. 6 illustrates the geometry 30 with a maximum span dimension 36 defined therein. A plurality of circles 38 are defined at various points along the maximum span dimension. The circles each have as their radius the minimum distance from their center point to the boundary of the geometry. FIG. 7 illustrates the geometry 30 with a minimum bounding rectangle 40. One the other hand, FIG. 8 illustrates the geometry 30 and a minimum circumference 42 circle defined about the geometry. Other geometries are not shown in FIGS. 5-8 to facilitate a clear view of the elements shown therein.

Approximations of geometries may alternatively include tiles. A description of generation of tiles as well as inscribed and bounding rectangles may be found in U.S. patent application Ser. No. 09/886,487 to Ravi Kanth V. Kothuri et al. for QUERY PRUNING USING INTERIOR RECTANGLES IN AN R-TREE INDEX, the entire contents of the disclosure of which is hereby incorporated by reference.

In addition to the above methods, the present invention includes a computer program product for performing the process of the present invention for determining relationships among objects represented in a database and other objects. The computer program product includes a computer readable medium. The computer program product also includes computer program instructions recorded on the computer readable medium and executable by a processor. The steps include any of those described above.

The present invention also includes a system for performing a process according to the present invention for determining relationships among objects represented in a database. The system includes a processor operable to execute computer program instructions. The system also includes a memory operable to store computer program instructions executable by the processor. The computer program instruction are for performing the steps of the process of the present invention as described above.

Figure 9:
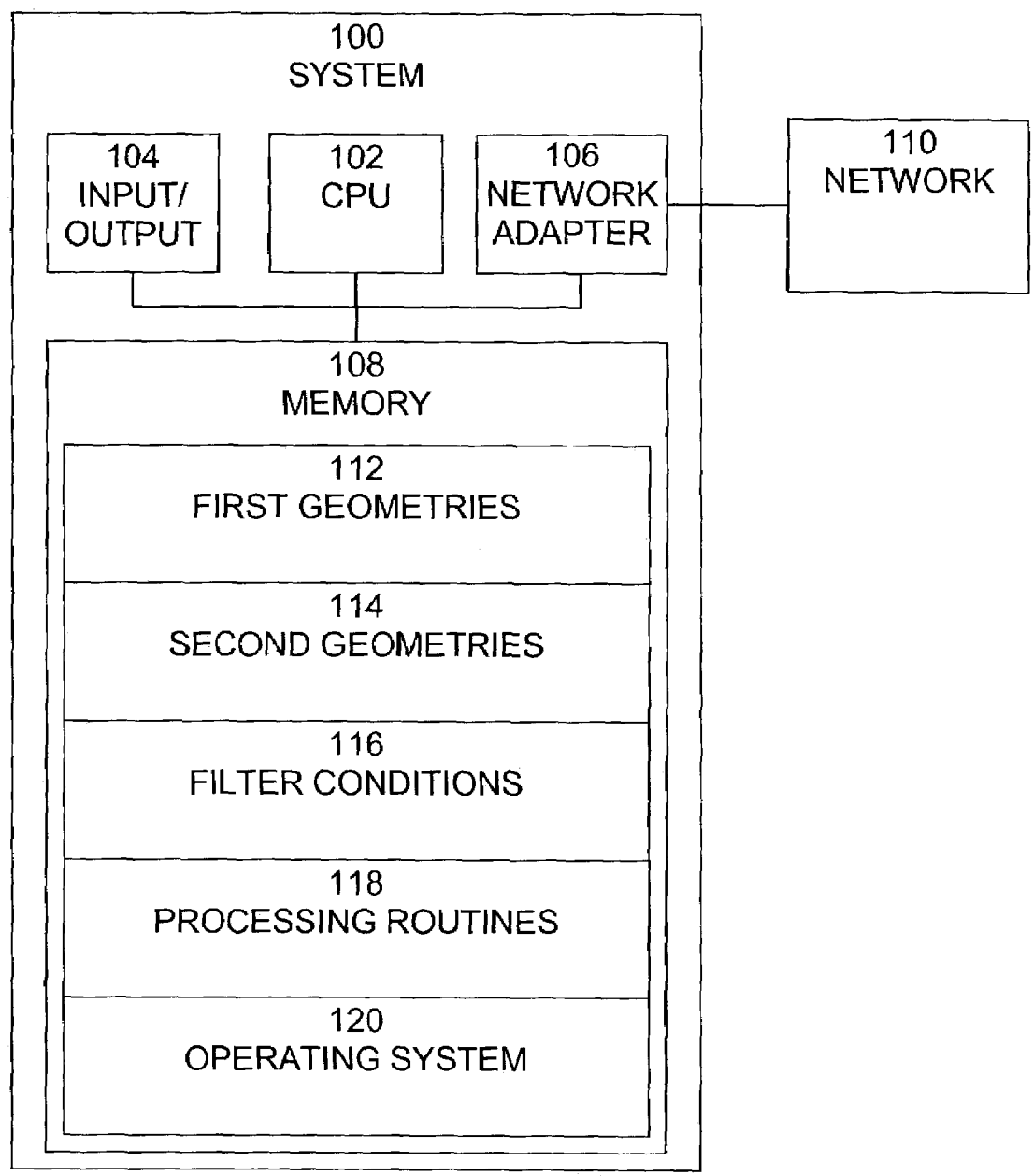
FIG. 9 represents an exemplary block diagram of a system according to the present invention for performing a process of determining relationships among objects represented in a database.

An exemplary block diagram of a system 100, according to the present invention, is shown in FIG. 9. System 100 is typically a programmed general-purpose computer system, such as a personal computer, workstation, server system, and minicomputer or mainframe computer. System 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces transaction processing system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as first geometry block 112, second geometry 114, and filter conditions block 116, and a plurality of blocks of program instructions, such as processing routines 118 and operating system 120. First geometry block 112 can store a plurality of first geometries that have been received by the system 100. Second geometries block 114 can store a plurality of second geometries. Filter conditions block 118 stores a plurality of filter conditions that may be used to compare geometries and reduce the number of candidate geometries. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Prior solutions/implementations for solving problems such as the present invention can solve typically first use the minimum bounding rectangle (MBR) approximations in an index. The prior solutions/implementations compare the minimum distance to the query with user-specified distance. If the minimum distance is less the user-specified distance, then the data geometry is fetched from the base-table and the exact distance between query and data geometry is computed and used to determine whether or not the data geometry needs to be included in result set.

On the other hand, the present invention avoids unnecessary fetch/computation of distance between data geometry and query geometries. The present invention can greatly improve performance. Along these lines, performance has been improved by about 40% for some real datasets as opposed to prior solutions. Since fewer geometries need to be fetched the memory/cache behavior also improves.

I claim:

1. A method for determining a within-distance relationship between a first geometry object and a second geometry object, the method comprising:
   receiving a query; and
   providing the query to a first filter configured to:
      define an exterior approximation of the first geometry and the second geometry;
      compute a distance between the exterior approximations;
      compare the computed distance with a first predetermined distance to determine whether the second geometry satisfies a first filter condition with respect to the first geometry, and
      if the first filter condition is satisfied, providing the second geometry to a query result set,
   otherwise, defining an interior approximation of the first geometry;
   expanding the interior approximation by a second predetermined distance; and
      comparing the expanded interior approximation with the second geometry to determine if the second geometry satisfies the first filter condition with respect to the first geometry; and
      if the first filter condition is satisfied, providing the second geometry to a query result set,
      otherwise, providing the first geometry and the second geometry to a second filter configured to perform an exact mathematical comparison of the first geometry and the second geometry to determine whether the second geometry satisfies a second filter condition with respect to the first geometry; and
      if the second filter condition is satisfied, providing the second geometry to the query result set,
      otherwise, excluding the second geometry from the query result set, wherein the result set specifies that the within-distance relationship between the first geometry object and the second geometry object is satisfied.

2. The method according to claim 1, wherein the first filter condition is satisfied if the second geometry is inside the expanded interior.

3. The method according to claim 1, wherein the exact mathematical comparison includes computing an exact distance between the first geometry and the second geometry to determine if the second geometry satisfies the first filter condition with respect to the first geometry.

4. The method according to claim 1, wherein the exterior approximation comprises a minimum bounding rectangle.

5. The method according to claim 4, further comprising:
   the first filter further operable to:
      compute circle that circumscribes the minimum bounding rectangle; and
      compare the circle with the second geometry to determine if the second geometry satisfies the first filter condition with respect to the first geometry.

6. The method according to claim 1, wherein defining the approximation of the first geometry comprises:
   identifying a center of the first geometry;
   identifying a minimum distance from the center to a boundary of the first geometry; and
   defining a circle having the minimum distance as its radius and the center of the first geometry as its center;
   wherein determining whether the second geometry satisfies a first filter condition with respect to the first geometry comprises comparing the circle with a second geometry.

7. The method according to claim 6, wherein defining the approximation of the first geometry further comprises:
   identifying a maximum span line of the first geometry;
   identifying a minimum distance from a plurality of points along the maximum span line to a boundary of the first geometry; and
   defining about each of the plurality of points a circle having the minimum distance as its radius;
   wherein determining whether the second geometry satisfies a first filter condition with respect to the first geometry comprises comparing each circle with a second geometry.

8. The method according to claim 6, wherein a circle is defined about eleven points equidistantly spaced along the maximum span line.

9. The method according to claim 6, wherein a circle is defined about to points equidistantly spaced along the maximum span dimension.

10. The method according to claim 1, wherein each circle is entirely contained within the first geometry.

11. The method according to claim 6, wherein the first filter condition comprises the second geometry lies entirely within one of the circles.

12. The method according to claim 1, wherein defining the exterior approximation comprises:
   defining a minimum bounding rectangle.

13. The method according to claim 6, wherein the center is a centroid.

14. The method according to claim 1, wherein the first geometry and the second geometry are described by geodetic data.

15. The method according to claim 1, wherein the first geometry and the second geometry are described by non-geodetic data.

16. The method according to claim 1, wherein the interior approximation comprises at least one tile.

17. A computer program product for performing a process of determining within-distance relationships among objects represented in a database, comprising:
   a processor operable to execute computer program instructions; and
   a memory operable to store computer program instructions executable by the processor, for performing the steps of:
   receiving a query; and providing the query to a first filter configured to:
define an exterior approximation of the first geometry and the second geometry;
compute a distance between the exterior approximations;
compare the computed distance with a first predetermined distance to determine whether the second geometry satisfies a first filter condition with respect to the first geometry, and
if the first filter condition is satisfied, providing the second geometry to a query result set,
otherwise, defining an interior approximation of the first geometry;
expanding the interior approximation by a second predetermined distance; and
comparing the expanded interior approximation with the second geometry to determine if the second geometry satisfies the first filter condition with respect to the first geometry; and
if the first filter condition is satisfied, providing the second geometry to a query result set,
otherwise, providing the first geometry and the second geometry to a second filter configured to perform an exact mathematical comparison of the first geometry and the second geometry to determine whether the second geometry satisfies a second filter condition with respect to the first geometry; and
if the second filter condition is satisfied, providing the second geometry to the query result set,
otherwise, excluding the second geometry from the query result set, wherein the result set specifies that the within-distance relationship between the first geometry object and the second geometry object is satisfied.

18. A system for performing a process of determining relationships among objects represented in a database, comprising:
a processor operable to execute computer program instructions; and
a memory operable to store computer program instructions executable by the processor, for performing the steps of:
receiving a query; and
providing the query to a first filter con figured to:
define an exterior approximation of the first geometry and the second geometry;
compute a distance between the exterior approximations;
compare the computed distance with a first predetermined distance to determine whether the second geometry satisfies a first filter condition with respect to the first geometry, and
if the first filter condition is satisfied, providing the second geometry to a query result set,
otherwise, defining an interior approximation of the first geometry;
expanding the interior approximation by a second predetermined distance; and
comparing the expanded interior approximation with the second geometry to determine if the second geometry satisfies the first filter condition with respect to the first geometry; and
if the first filter condition is satisfied, providing the second geometry to a query result set,
otherwise, providing the first geometry and the second geometry to a second filter configured to perform an exact mathematical comparison of the first geometry and the second geometry to determine whether the second geometry satisfies a second filter condition with respect to the first geometry; and
if the second filter condition is satisfied, providing the second geometry to the query result set,
otherwise, excluding the second geometry from the query result set wherein the result set specifies that the within-distance relationship between the first geometry object and the second geometry object is satisfied.

* * * * *